United States Patent

Smith

[15] 3,700,880
[45] Oct. 24, 1972

[54] DISPLAY SYSTEM

[72] Inventor: Victor S. Smith, Channing House, Wargrave, England

[22] Filed: Dec. 8, 1970

[21] Appl. No.: 96,092

Related U.S. Application Data

[63] Continuation-in-part of Ser. No. 813,953, April 7, 1969, Pat. No. 3,609,339.

[30] Foreign Application Priority Data

Dec. 12, 1969 Spain......................374478/69

[52] U.S. Cl. ..............................................240/10 R
[51] Int. Cl. ................................................F21p 1/02
[58] Field of Search.......240/10 R, 10.1; 40/132 E, 132 F, 40/132 G, 132 H

[56] References Cited

UNITED STATES PATENTS

| | | |
|---|---|---|
| 1,717,785 | 6/1929 | Kaehni et al.............40/132 G |
| 3,538,323 | 11/1970 | Ziegler......................240/10.1 |
| 2,583,055 | 1/1952 | Kress........................40/132 F |
| 2,770,999 | 11/1956 | Older........................40/132 R |
| 1,348,957 | 8/1920 | Pope..........................40/132 F |

*Primary Examiner*—S. Clement Swisher
*Attorney*—James H. Littlepage

[57] ABSTRACT

A shallow box-like housing has a front wall composed of a translucent screen surrounded by an opaque frame. Within the housing is or are one or more rotating discs faced with randomly oriented reflective plastic. Rays from a plurality of lights hidden behind the opaque frame are reflected by the disc or discs onto the inner side of the translucent screen.

6 Claims, 5 Drawing Figures

PATENTED OCT 24 1972    3,700,880
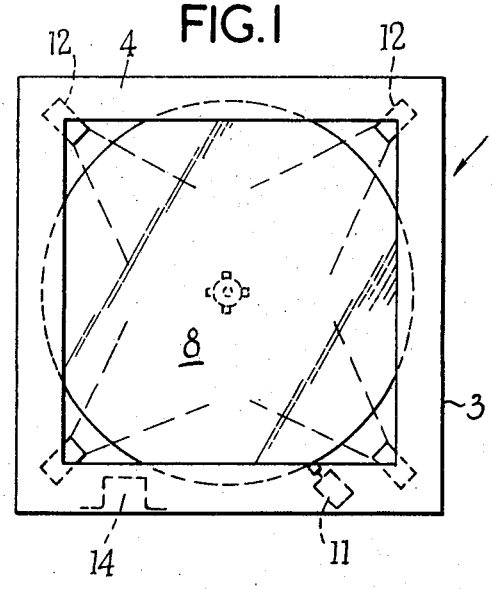
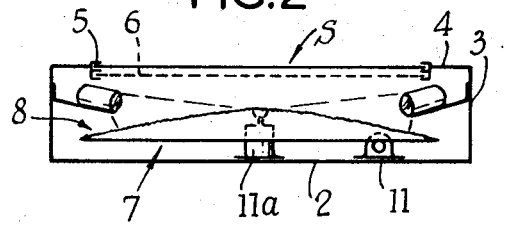
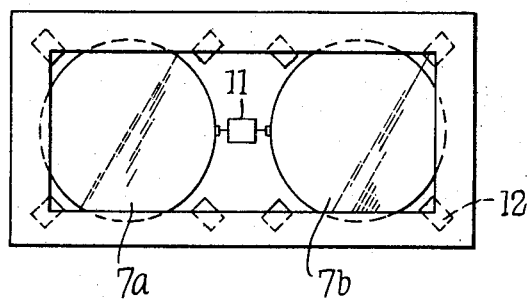
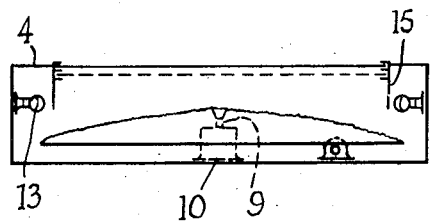
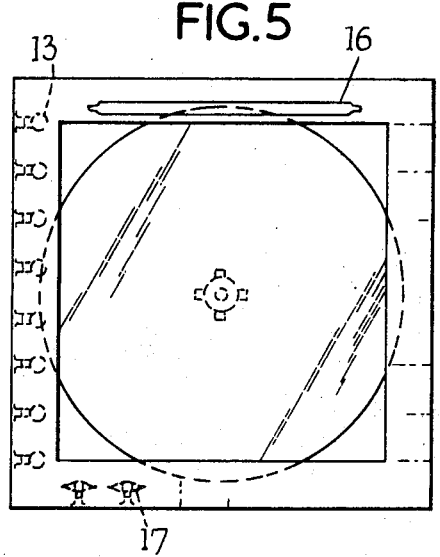

DISPLAY SYSTEM

RELATED APPLICATION

Smith Ser. No. 813,953 now U.S. Pat. No. 3,609,339, filed Apr. 7, 1969, for DISPLAY SYSTEM, of which this application is a continuation-in-part.

FIELD OF INVENTION

Illumination, Arena, Color Projector.

PRIOR ART

U.S. Pat. Nos. 1,878,331 Savage; 3,119,565 Nottingham; 3,242,330 Schoffer; 3,318,187 Prohaska; 3,366,786 Delano.

OBJECTS

The present invention relates to a device for projecting a visual light pattern on to a screen and is a modification or improvement of the invention the subject of Ser. No. 813,953 (supra).

In the latter specification there is described and claimed a device for projecting a visual light pattern on to a screen comprising a light source and a reflector arranged in an optical path to reflect light from the source on to the screen, the reflector comprising an irregular reflecting surface composed at least partly of colored reflecting metalized plastics material.

According to the present invention there is provided a device for projecting a visual light pattern on to a screen comprising a light source and a reflector arranged in an optical path to reflect light from the source on to the screen, the reflector comprising an irregular reflecting surface composed at least partly of colored reflecting material, wherein each reflector is in the form of a rotating disc, drum or belt provided with driving means and is illuminated from more than one light source.

The device may comprise only a single reflector, or it may comprise a plurality of reflectors arranged substantially in a common plane.

Preferably the device comprises a housing provided with a translucent screen within which the remaining components are mounted and arranged so that the light pattern is projected (in operation) on to the inside surface of the screen and rendered visible to an outside viewer.

The arrangement according to the present invention enables comparatively thin or "slimline" display units to be constructed. For example, the depth of the housing (in a direction at right angles to the screen) is preferably less than 1 foot and may be as little as 2 or 3 inches.

The reflector or reflectors are of much larger diameter than those described in the preferred embodiment of Ser. No. 813,953. For example, the radius of the reflector or reflectors will normally be considerably greater than the minimum dimension of the screen face of the housing. In the preferred case the housing is of the minimum dimension to contain the screen.

In a preferred embodiment to be described, the screen is surrounded by a frame forming part of the front face of the housing, the light sources being located behind the frame so as to be substantially shielded thereby. Part of the reflector or reflectors may extend into the space behind the frame.

The or each reflector disc may be rim driven by a fractional horsepower electric motor which, together with an transformers or other electric parts necessary for operation of the device, may be conveniently located behind the frame. Alternatively, however, the or each reflector may be driven by a motor which is centrally located behind the reflector. If the reflector is dished or bowl-shaped (the reflecting surface being normally convex) the motor may conveniently be mounted substantially within the depth of the reflector.

As in Ser. No. 813,953, quartz halogen lamps may be used, for example, within cylindrical lamp housings, but much cheaper light sources may also be used, such as low voltage bulbs, which can conveniently be connected so as to be connectable directly to an electric mains source, and which can be located behind the frame and, for example, shielded from the screen by an inwardly turned flange at the inside edge of the frame. Similarly, strip lights or cylindrical bulbs can be used.

The said colored reflecting material is preferably a metalized plastics material as described in Ser. No. 813,953, and the preferred material has the composition of that material sold under the Trade Mark "Vapcolex" at the date of filing of this complete specification. This is the same material as sold at the filing date of Ser. No. 813,953.

The reflector, although of larger area and preferably dished, may be constructed substantially as described in Ser. No. 813,953. For example, the deformable reflecting material is preferably crinkled to produce the irregular reflecting surface and the reflector preferably comprises a composite of deformable material of different color or uncolored (color is used in this sense excluding white). The reflecting surface may contain one or more natural or artificial jewels and/or sequins and/or broken glass chips.

Where there is more than one reflector, these may be arranged to rotate at different speeds.

Preferred embodiments are hereafter described with reference to the accompanying drawings, in which:

FIG. 1 is a plan view from the top of a device according to the invention with the screen removed;

FIG. 2 is a side view of the device of FIG. 1 with the side removed to show the interior;

FIG. 3 is a view similar to that of FIG. 1 of an alternative embodiment;

FIG. 4 is a view similar to FIG. 2 of yet another embodiment; and

FIG. 5 is a view similar to that of FIG. 1 showing various alternative arrangements of light sources.

Referring to FIG. 1 there is shown a housing 1 which is square in plan view and which comprises a bottom plate 2 (FIG. 2) having an upturned flange adapted to be secured to the side walls 3 and frame 4 which are in one piece, e.g., of metal sheet. The inner edge of the frame 4 is provided with a framework 5 of slots adapted to receive a translucent screen, e.g., of glass or perspex or back projection material and also, optionally, a screen or plate 6 which may contain advertising material.

Mounted within the housing for rotation in the plane of the screen is a reflector 7 having a reflecting surface 8.

The reflecting surface 8 is composed of a deformable reflective colored material and the preferred material is metalized Melinex which is sold under the Registered Trade Mark Vapcolex. This material is highly reflective and is available in a number of different colors. The material is in the form of thin sheets resembling paper and may be crinkled by hand to produce randomly oriented reflecting surfaces. To produce the reflector 7 a sheet of this material or a composite sheet of different pieces of different color are crinkled as described and adhered to a circular disc which acts as a base of the reflector. Natural or artificial jewels or sequins may be distributed on the Melinex to enhance the effect.

The reflector may be provided with a central axle 9 (FIG. 4) mounted in a bearing 10 secured to the back plate 2 of the housing so that the reflector is free to rotate. In this case it may be driven from the rim by means of a fractional horsepower electric motor 11. Alternatively as shown in dotted lines in FIG. 2 it may be provided with a center drive electric motor and gear 11a. As illustrated the disc forming the reflector base is dished so that its reflecting surface is slightly concave. However, it may be flat if desired. The rim of the disc may be flanged as shown in FIG. 2 to assist in forming the rim drive.

Four quartz halogen lamp units 12 are arranged at the corners of the housing behind the frame so as to be substantially shielded thereby. The cylindrical lamp housings are mounted as shown in FIG. 2 to the side walls 3, for convenience, and point slightly downwardly towards the reflector so as to cover as large a portion of the surface 8 as possible as shown in the broken lines which outline the beams. However, the mountings for the lamp housings are preferably adjustable so that they can be shifted in position to obtain the best possible effect.

Referring to FIG. 3 there is shown an alternative embodiment. The construction is substantially as shown in FIGS. 1 and 2, except that the housing is extended in one dimension so as to allow room for two reflectors 7a, 7b. As shown a single motor 11 is used to drive both reflectors in opposite directions. However, individual rim drive motors may be used or center drive motors.

FIG. 4 shows an alternative embodiment in which, instead of four quartz halogen lamp units, an array of small wattage and low voltage bulbs 13 are mounted around the housing behind the frame 4. These bulbs are also shown as one possible form of lighting on the left-hand side of FIG. 5 which shows other alternative forms of lighting which may be used. The light bulbs 13 may be connected electrically in series, or in series and parallel depending upon the number and the voltage, so as to be connectable directly to an electric mains source without the need for a transformer. If transformers are necessary, they may be mounted as shown in FIG. 1 at 14 behind the frame and between the reflector and the side walls 3.

The light bulbs 13 are also partly shielded by an interior flange 15 which is formed at the inner edge of the frame 4 and may be part of the framework 5. This forms a convenient and cheap light source. The frame and flange form a light unit preventing direct glare from the bulbs 13 on to the screen.

As shown in FIG. 5, the light sources may alternatively or in addition to other forms of light source contain strip lights 16 or small cylindrical bulbs 17 as for example used in motor cars.

The housing and reflector base may be of any convenient material, for example, moulded plastics material. Many modifications are possible within the scope of the invention. For example, many of the variations and additional optional features fully set out in Ser. No. 813,953 may be adopted in the devices of the present invention.

The reflector may vary in size from that of Ser. No. 813,953, i.e., a few inches in diameter, to very large diameters, for example, 20 feet. Discs having a diameter of greater than 3 feet are particularly useful in providing special effects for television or cinema studies and one particular embodiment employs two such wheels each of 8 feet in diameter and each illuminated from a number of points around its circumference. Large embodiments of this type need not have a separate housing, the various components being conveniently mounted in and about the studio. The screen may be a large sheet of translucent plastics material or curtain material depending upon the effect required.

Means may be provided for imparting a flickering effect or a "strobe" effect to the light sources or one of them. This may be in the form of an interrupter in the electrical circuit.

Instead of the discs shown in the drawings, the reflectors can alternatively be in the form of drums or belts. To form the belt the reflecting material may be adhered to a flexible support adapted to rotate about a pair of parallel rollers, one of which may be driven by a frictional horsepower electric motor. A "slim-line" device can be satisfactorily produced by this means. Alternatively, one or a plurality of parallel cylinders or drums can be employed. The depth will in this case be somewhat larger than can be produced with a disc or belt.

I claim:

1. A device for projecting a visual light source onto a screen, comprising
   a shallow box-like housing having a frame wall thereof constituted by a translucent screen surrounded by an opaque frame,
   at least one disc means rotatably supported in said housing behind said screen and having a substantially conical face thereof disposed towards said screen, each said disc means having on the conical face thereof a reflective surface comprised of crinkled metalized plastic material of differently colored randomly oriented reflective surfaces,
   means for rotating said disc means,
   a plurality of light sources in said housing disposed generally laterally of the disc means behind the opaque frame for projecting light onto said disc means and thence by reflection onto the screen,
   and means in said housing for blocking direct transmittal of light rays from the light sources onto the screen.

2. The combination claimed in claim 1, the means for blocking direct transmittal of light rays from the light sources to the screen comprising shields surrounding the light sources and having open ends directed towards the disc means.

3. The combination claimed in claim 1, the means for blocking direct transmittal of light rays from the light source onto the screen comprising an opaque flange on the inner periphery of the frame, said flange extending inwardly of the housing and being disposed between the light sources and the screen.

4. The combination claimed in claim 1, there being a plurality of said disc means the outer peripheries of which are disposed substantially in a common plane.

5. The combination claimed in claim 1, there being a single disc means, the outer periphery of which is disposed at least in part behind the frame.

6. The combination claimed in claim 1, and means for imparting a flickering effect on at least one of the light sources.

* * * * *